(12) United States Patent
Armstrong et al.

(10) Patent No.: US 7,047,337 B2
(45) Date of Patent: May 16, 2006

(54) CONCURRENT ACCESS OF SHARED RESOURCES UTILIZING TRACKING OF REQUEST RECEPTION AND COMPLETION ORDER

(75) Inventors: Troy David Armstrong, Rochester, MN (US); Kyle Alan Lucke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 448 days.

(21) Appl. No.: 10/422,193

(22) Filed: Apr. 24, 2003

(65) Prior Publication Data

US 2004/0215858 A1    Oct. 28, 2004

(51) Int. Cl.
G06F 12/00    (2006.01)
G06F 12/14    (2006.01)

(52) U.S. Cl. ............ 710/200; 710/240; 710/104; 709/102; 709/105; 711/150

(58) Field of Classification Search ........ 709/100–108, 709/213–219; 710/200, 60–61, 240–244, 710/104–119; 718/104; 711/150
See application file for complete search history.

(56) References Cited

U.S. PATENT DOCUMENTS

| | | | |
|---|---|---|---|
| 5,774,731 A | 6/1998 | Higuchi et al. | |
| 5,805,900 A | 9/1998 | Fagen et al. | |
| 5,931,924 A * | 8/1999 | Arimilli et al. | 710/41 |
| 6,237,019 B1 * | 5/2001 | Ault et al. | 718/104 |
| 6,598,068 B1 * | 7/2003 | Clark | 718/104 |
| 6,725,457 B1 * | 4/2004 | Priem et al. | 718/104 |
| 6,745,274 B1 * | 6/2004 | Snyder et al. | 710/240 |

OTHER PUBLICATIONS

Douglas E. Comer, "Internetworking With TCP/IP," vol. I: Principles, Protocols, and Architecture; Fourth Edition; Chapter 13; "Reliable Stream Transport Service (TCP)," Prentice Hall, 2000, pp. 209-251, XP-002310034, ISBN: 0-13-018380-6.
Jeff Dike, "User Mode Linux Howto," Jun. 18, 2002, pp. 1-41, XP-002310035, http://web.archive.org/web/20030407073452/user-mode-linux.sourceforge.net/UserModeLinux-HOWTO.html, retrieved on Jul. 12, 2004.
David A. Deming, "The SCSI Tutor: An In-depth Exploration of the Small Computer System Interface," ENDL Publication, XP-002310036, ISBN 1-879936-08-9.

* cited by examiner

Primary Examiner—Rehana Perveen
Assistant Examiner—Raymond N Phan
(74) Attorney, Agent, or Firm—Wood, Herron & Evans, LLP

(57) ABSTRACT

An apparatus, program product and method to manage access to a shared resource by a plurality of processes in a multithreaded computer via a collection of atomic operations that track both the order in which requests that use a shared resource are received, and the order in which processing of such requests are completed after they are received. Dispatching of requests is effectively deferred until processing of all non-dispatched requests that were received earlier than a most recently completed request has been completed. In many instances, completion of processing of requests can be performed non-atomically, thus reducing contention issues with respect to the shared resource. Furthermore, dispatching of requests may be batched to reduce the overhead associated with individual dispatch operations.

25 Claims, 4 Drawing Sheets

CONCURRENT ACCESS OF SHARED RESOURCES UTILIZING TRACKING OF REQUEST RECEPTION AND COMPLETION ORDER

FIELD OF THE INVENTION

The invention relates to computers and computer software, and in particular, to managing concurrent access to shared resources in a computer.

BACKGROUND OF THE INVENTION

Given the continually increased reliance on computers in contemporary society, computer technology has had to advance on many fronts to keep up with increased demand. One particular subject of significant research and development efforts is parallelism, i.e., the performance of multiple tasks in parallel.

A number of computer software and hardware technologies have been developed to facilitate increased parallel processing. From a hardware standpoint, computers increasingly rely on multiple microprocessors to provide increased workload capacity. Furthermore, some microprocessors have been developed that support the ability to execute multiple threads in parallel, effectively providing many of the same performance gains attainable through the use of multiple microprocessors. From a software standpoint, multithreaded operating systems and kernels have been developed, which permit computer programs to concurrently execute in multiple threads so that multiple tasks can essentially be performed at the same time.

In addition, some computers implement the concept of logical partitioning, where a single physical computer is permitted to operate essentially like multiple and independent "virtual" computers (referred to as logical partitions), with the various resources in the physical computer (e.g., processors, memory, input/output devices) allocated among the various logical partitions. Each logical partition executes a separate operating system, and from the perspective of users and of the software applications executing on the logical partition, operates as a fully independent computer.

While parallelism effectively increases system performance by virtue of the ability to perform multiple tasks at once, one side effect of parallelism is an increased system complexity due to the need to synchronize the operation of multiple concurrent processes, particularly with regard to system resources that are capable of being shared by multiple threads. Separate threads or processes that are capable of accessing specific resources are typically not aware of the activities of other threads or processes. As such, a risk exists that one process might access a specific resource in an unexpected manner relative to another process, creating in indeterminate results and potential system errors.

As but one of many examples, an input/output (I/O) adapter such as an ethernet network adapter may have a finite number of resources that are capable of being shared by multiple threads or processes executing in a computer. One such type of resource is a frame buffer, which is used to store frames of data that are communicated to and received from a ethernet-compatible network. A frame buffer is often arranged into slots that are used in a sequential order by different processes, with the I/O adapter being notified of each slot that was consumed. Consuming one of the slots, however, may occupy a significant amount of time, during which other processes may not be able to utilize the other slots. Moreover, a concern exists that two processes may attempt to use the same slot at the same time.

To address these concerns, a serialization mechanism such as a lock or semaphore may be used to limit the access to a shared resource to one process at a time. A lock or semaphore is essentially a "token" that can be obtained exclusively by a process or thread in a multithreaded environment to access a particular shared entity or resource. Before a process or thread can access a resource, it must first obtain the token from the system. If another process or thread currently possesses the token, the former process or thread is not permitted to access the resource until the token is released by the other process or thread. In this manner, the accesses to the resource are effectively "serialized" to prevent indeterminate operations from occurring.

Whenever a shared resource is managed by a serialization mechanism, parallelism opportunities often diminish, as any thread or process that needs to access a locked resource often must wait until the lock on that resource is released before proceeding with accessing the resource. As such, there is a strong desire to minimize the frequency and duration of locks placed on shared resources.

With the aforementioned I/O adapter example, the most straightforward solution to ensuring conflict-free access to a frame buffer is to simply placing a lock around any use of the frame buffer. By doing so, however, parallelism opportunities are severely restricted, as a significant amount of work may need to be performed by a process to prepare, interpret and otherwise process the data stored in the frame buffer. Locking out access to the frame buffer by other processes while all of these activities occur is therefore counterproductive from a parallelism standpoint.

It may be possible in some circumstances to perform some up-front work associated with using a shared resource prior to obtaining a lock on the shared resource, thereby reducing the amount of time that the shared resource may need to be locked to other processes. However, conventional attempts directed in this manner have been found to require duplicate checking of resource availability and more complex up-front work to be performed.

A substantial need therefore exists for an improved manner of coordinating the access to a shared resource by multiple threads or processes executing in a multithreaded computer.

SUMMARY OF THE INVENTION

The invention addresses these and other problems associated with the prior art in providing an apparatus, program product and method in which access to a shared resource by a plurality of processes in a multithreaded computer is managed via a collection of atomic operations that track both the order in which requests that use a shared resource are received, and the order in which processing of such requests are completed after they are received. Dispatching of requests is effectively deferred until processing of all non-dispatched requests that were received earlier than a most recently completed request has been completed.

In particular, consistent with one aspect of the invention, a shared resource may be accessed by a plurality of processes that are capable of asynchronously issuing requests that use the shared resource. In a first process, a unique identifier is atomically assigned to a current request that uses the shared resource, where the unique identifier is assigned to the current request based upon the order in which the current request is received relative to other requests issued by the plurality of processes. Thereafter, processing of the current request is completed using the unique identifier, and after such processing is complete, a count of completed requests is atomically incremented, and an atomic determination is made as to whether processing of every other request issued prior to a most recently completed request has been completed. If so, each non-dispatched request for which processing has completed is then dispatched.

In some embodiments consistent with the invention, the completion of processing of a request may be performed non-atomically, thus limiting the duration of atomic operations performed in connection with processing a request, and thus reducing contention to the shared resource. Moreover, in some embodiments, a dispatch of non-dispatched requests may result in multiple requests being dispatched in a batch, thus reducing the overhead of individual dispatches.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Figure 1:
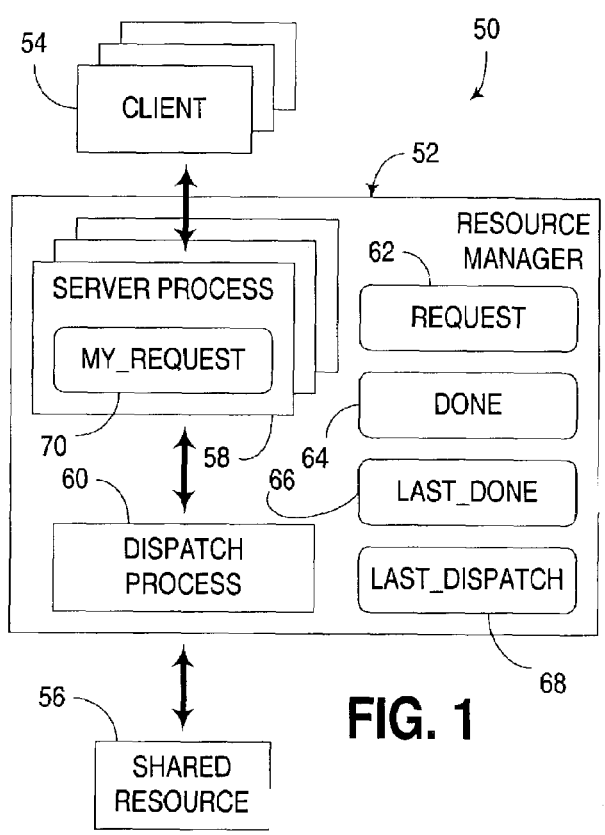
FIG. 1 is a block diagram of a generic computer architecture supporting concurrent access of a shared resource by a plurality of clients in a manner consistent with the invention.

The embodiments discussed hereinafter track both the order in which requests that use a shared resource and that are issued by multiple clients are received, and the order in which processing of such requests are completed, in connection with the dispatch of the requests to use the shared resource. The requests are capable of being issued asynchronously, and moreover, are capable of completing out-of-order. As a result, requests are assigned unique identifiers as they are received, based upon the order in which the requests are received. Moreover, the number of completed requests is tracked, and a determination is made in connection with handling each request to determine if the processing of every other request issued prior to a most recently completed request has been completed. Once it has been determined that this condition has been met, each non-dispatched request, for which processing has completed, is then dispatched.

As will become more apparent below, the tracking of the order in which requests are received, and the order in which such requests are completed, may be made via the use of a series of counters associated with the shared resource, and capable of being atomically accessed via an exclusive locking mechanism such as a semaphore. A request counter may be used to assign unique identifiers to requests as they are received. A done counter may be used to track the number of completed requests (i.e., requests for which processing, such as preparation and submission, has been completed). A last_done counter may be used to track the most recently completed request, while a last_dispatch counter may be used to track the most recently dispatched request.

In many embodiments consistent with the invention, only the access to the aforementioned counters need be atomic. Other processing associated with handling a request may often be handled non-atomically, thus limiting the duration of atomic operations that are performed in connection with handling a request, and thus reducing contentions that might otherwise hamper concurrent access to the shared resource.

In addition, embodiments consistent with the invention support the ability to provide batch dispatching of requests. Dispatching of a request may occur in different manners consistent with the invention. For example, where a shared resource is a slot in a frame buffer of an input/output adapter such as a network adapter, a dispatch operation may be implemented as the raising of an interrupt to a client whenever a packet is received for that client via the input/output adapter. Where a shared resource is a mass storage device in a network such as a SCSI network, a dispatch operation may be a notification to an operating system that an I/O request is complete.

The nature of a request will typically vary depending upon the particular type of shared resource at issue. For example, for a database resource, a request may represent a database transaction, while for a file management system resource, a request may represent a file access request. For a storage device, a request may represent an input/output (I/O) request, while for a processor resource, a request may represent a request to allocate the processor to a logical partition. Other shared resource and request implementations will be apparent to one of ordinary skill in the art having the benefit of the instant disclosure.

Turning now to the Drawings, wherein like numbers denote like parts throughout the several views, FIG. 1 illustrates an exemplary configuration of a generic computer architecture 50 that may be used to support concurrent and asynchronous access of shared resources in a manner consistent with the invention. In particular, architecture 50 is shown incorporating a resource manager 52 that manages access by a plurality of clients 54 to a generic shared resource 56.

Shared resource 56 may be considered to represent practically any type of computer resource that is capable of being accessed by a computer, e.g., various types of input/output and other hardware resources such as ethernet adapters, SCSI adapters, and other network adapters; storage adapters and controllers; workstation adapters and controllers; database controllers; processors; other input/output adapters and controllers, etc. Moreover, a shared resource 56 may be considered to include various types of software resources, e.g., kernel or operating system services, file management systems, databases, etc. A shared resource may also comprise sub-components of the aforementioned types of resources, e.g., buffers or other memory resources resident in an input/output adapter.

Clients 54 may each be considered to represent practically any program code, or even an external programmable device, capable of accessing resource 56 in an asynchronous manner relative to any other client. In the illustrated embodiments, typically each client 54 is implemented using program code on a computer that executes in one of a plurality of parallel processes or threads resident in the computer, e.g., using one or more processors, including single threaded and/or multithreaded processors, software-based or operating system supported multithreading, logical partitioning, and/or other techniques that enable multiple instances of execution to asynchronously access a shared resource in parallel.

To manage the access to shared resource 56, resource manager 52 includes a plurality of server processes 58 that act as individual servers for resource access requests generated by various clients 54. Each server process 58 may be statically or dynamically assigned to a given client 54, and it will be appreciated that the mapping between server processes and clients may not necessarily be 1:1, and may change from time to time.

Resource manager 52 also includes a dispatch process 60 that interacts with server processes 58 to coordinate access to shared resource 56. As will become more apparent below, dispatch process 60 may implement batch dispatching to dispatch multiple access requests at a time. Moreover, dispatch process 60 may also manage the return of data from shared resource 56, and may interact with server processes 58, or directly with each client, to route the incoming data to the appropriate client. In other embodiments, however, return data may be handled separately from dispatch process 60. Furthermore, it will be appreciated that resource manager 52 may manage multiple shared resources, or multiple resource managers may be used to manage multiple shared resources.

To support the concurrent access of shared resource 56 in a manner consistent with the invention, resource manager 52 includes four atomic counters 62, 64, 66 and 68.

Counter 62 is referred to herein as a request counter, and is used to supply an identifier to be assigned to a next access request generated by one of clients 54. For each generated request, request counter 62 is incremented to a next identifier, with that identifier stored in the server process in a my_request variable 70 to uniquely identify that request. In various embodiments, request counter 62 may be pre- or post-incremented such that the current value in the counter may represent either the last received request, or the value that will be assigned to the next request when it is received.

Counter 64 is referred to herein as a done counter, and is used to track the number of access requests that have completed. Counter 66 is referred to herein as a last_done counter, and is used to maintain the identifier of the last (or most recent) access request that has completed. Counters 64 and 66 are typically both required given that requests are permitted to complete out-of-order, i.e., a later request may be permitted to complete before an earlier request.

Counter 68 is referred to as a last_dispatch counter, and is used to store the identifier of the last (or most recent) access request that has been dispatched to the shared resource by dispatch process 60, and is typically set to the value of last_done counter 66 the last time the dispatch process was notified. It will be appreciated that the specific names utilized to identify counters 62, 64, 66 and 68 have been chosen merely for convenience, and do not limit the scope of the invention.

In the illustrated-embodiment, each counter 62, 64, 66 and 68 is initialized to zero, and counters 62 and 64 are incremented by one, resulting in each counter always being updated with an always increasing integer. It will be appreciated, however, that other monotonic sequences of numbers or other identifiers may also be used to uniquely identify requests consistent with the invention. Moreover, while it may be possible to use counter sizes that enable counters to roll-over after a certain number of requests are processed, it has been found that processing is substantially simplified by utilizing counter sizes that do not enable the counters to roll-over in a feasible period of time (e.g., 8 byte counters). It is also desirable to reinitialize each counter during system startup, such that, as a practical matter, no counter will ever roll-over during the normal course of operation of computer architecture 50.

Figure 2:
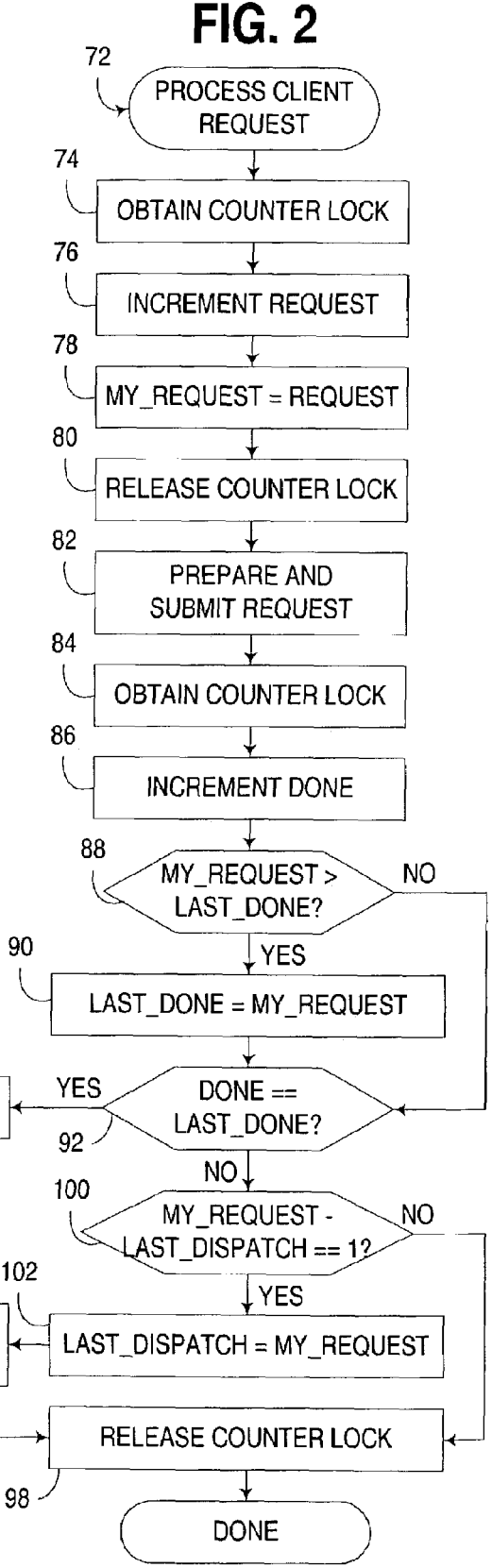
FIG. 2 is a flowchart illustrating the program flow of a process client request routine executed by a server process in the computer architecture of FIG. 1 to process a client request.

Now turning to FIG. 2, an exemplary process client request routine 72, which may be utilized to process a client request in the manner consistent with the invention, is illustrated in greater detail. Routine 72 is executed by a server process 58 in response to each request, and as such, when multiple clients are concurrently submitting requests, multiple instances of routine 72 may be executing in parallel at any given time.

Routine 72 begins in block 74 by obtaining a counter lock, that is, by obtaining a lock or semaphore associated with counters 62–68. In the illustrated embodiment, such a semaphore may be associated with all of counters 62–68, or in the alternative, separate locks may be provided for each such counter, or given locks may be assigned to subsets of counters.

Irrespective of whether a lock is shared by multiple counters, or is only assigned to one or a subset of counters, once the lock is obtained in block 74, control passes to block 76 to increment request counter 62. Block 78 then sets the my_request variable 70 to be associated with the request to the current value of request counter 62. Thereafter, block 80 releases the counter lock. As a result, blocks 74–80 effectively implement an atomic increment operation on the request counter, also assigning a unique request identifier to the request based upon a post-incremented value of the request counter. In other embodiments, a pre-incremented value of the request counter may be used. Moreover, so long as a valid copy of the request counter is obtained under lock, the assignment of a value to the my_request variable in block 78 may alternatively be performed outside of the lock. Irrespective of the manner used, however, the request is effectively assigned a unique identifier based upon the order in which the request is received relative to other requests issued by the plurality of clients.

Next, block 82 completes processing of the request by preparing and submitting the request on behalf of the client. Of note, however, block 82 is not performed under a lock or semaphore, and as such, does not involve any contention problems that may stall the current process or another process as a result of a conflict in accessing a shared resource. The steps associated with preparing and submitting a request will typically vary depending on the particular request type and the type of resource being accessed. For example, for the purposes of submitting a request to an input/output adapter, various steps such as preparing a network frame for transfer via a direct memory access (DMA) operation may be performed in block 82. Other operations associated with preparing a request, submitting a request and/or otherwise completing processing of a request, e.g., memory allocation, copying or transferring data, acquiring pooled resources, etc., may also be performed in block 82 consistent with the invention.

Next, block 84 again obtains a counter lock, waiting as necessary for the counter lock to be obtained. Once the counter lock is obtained, control passes to block 86 to increment done counter 64, thereby establishing that processing of the current request is complete.

Block 88 then determines whether the identifier for the current request is greater than the value stored in last_done counter 66. If so, the current request is known to be the most recent or last request that has completed. Control therefore passes to block 90 to set the value of last_done counter 66 to equal the current request identifier. Control then passes to block 92. Moreover, returning to block 88, if the current request identifier is not greater than that stored in last_done counter 66, block 88 passes control directly to block 92, thereby bypassing block 90.

Block 92 determines whether processing of every other request issued prior to the most recently completed request has been completed, typically by determining whether the value stored in done counter 64 is equal to the value stored in last_done counter 66. When this condition is met, it is known that every request earlier in time than the most recently completed request (identified in counter 66) has been completed, as a smaller value in done counter 64 indicates that at least one earlier request has not yet completed.

If the condition in block 92 is met, control is passed to block 94 to set the value in last_dispatch counter 68 to equal that stored in last_done counter 66, indicating that every request up to and including the request identified in the last_done counter has been completed. Control then passes to block 96 to notify the dispatch process to dispatch all as yet undispatched requests (typically those between the value in last_done counter 66 and the previous value stored in last_dispatch counter 68 prior to execution of block 94. Control then passes to block 98 to release the counter lock obtained in block 84, whereby routine 72 is complete. It should be appreciated that block 94 may be executed after block 96 in other embodiments consistent with the invention.

Returning to block 92, if not all earlier requests are completed, block 92 passes control to block 100 to determine whether the identifier for the current request was the first request initiated after the last dispatch of requests by the dispatch process, typically by determining if the current identifier is one greater than the value stored in last_dispatch counter 68.

If so, control passes to block 102 to set the value of counter 68 to equal the current request identifier. Control then passes to block 96 to notify the dispatch process to dispatch the current request. Otherwise, returning to block 100, if the condition set forth in the block is not met, no further work is required to be performed through this instance of routine 72, as other work being performed later will cause the request to ultimately be dispatched. Accordingly, block 100 passes control directly to block 98 to release the counter lock, and terminate the routine.

It should be appreciated that the decision performed in block 100, and the resulting flow through block 102, may be omitted in some embodiments. The aforementioned functionality provides a benefit in terms of reducing latency for a first request initiated after a batch dispatch. In some environments, latency of a first request may not be a significant concern, so the aforementioned functionality may be omitted in such embodiments. In such an instance, block 92 may pass control directly to block 98 if the condition set forth therein is not met.

The above request handling technique provides a number of unique advantages in terms of managing the access of a shared resource by multiple clients. Multiple access requests may be generated and retained without requiring synchronization or serialization from the perspective of generating the requests. For example, where requests are built in buffers that are partitioned into a limited number of blocks or slots, clients may be concurrently assigned to particular slots without having to synchronize the complete consumption of such slots. In addition, multiple requests may be dispatched to a shared resource in batches, rather than one-by-one, thus eliminating much of the overhead associated with each dispatch (e.g., the overhead associated with notifying a client via an interrupt). Furthermore, there is reduced contention on the locks used to protect and manage access to the shared resource. Locks may only be held on behalf of specific requests during relatively short updates of the above-described counters, enabling much of the overhead associated with building and preparing a request prior to its dispatch to be performed without requiring any synchronization mechanism to be obtained.

Figure 3:
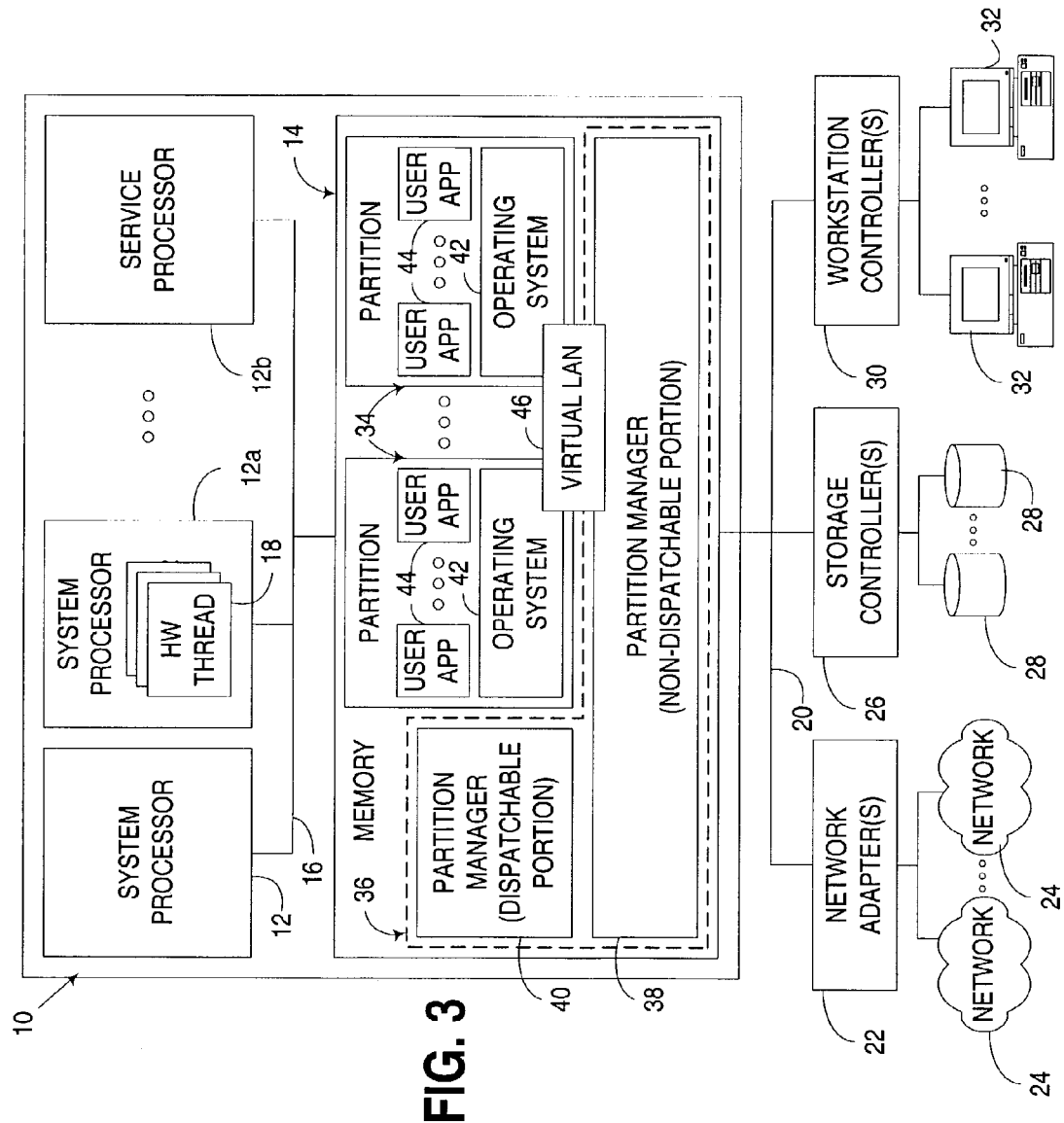
FIG. 3 is a block diagram of the principal hardware components in a logically-partitioned computer implementing concurrent access of a shared resource consistent with the invention.
Figure 4:
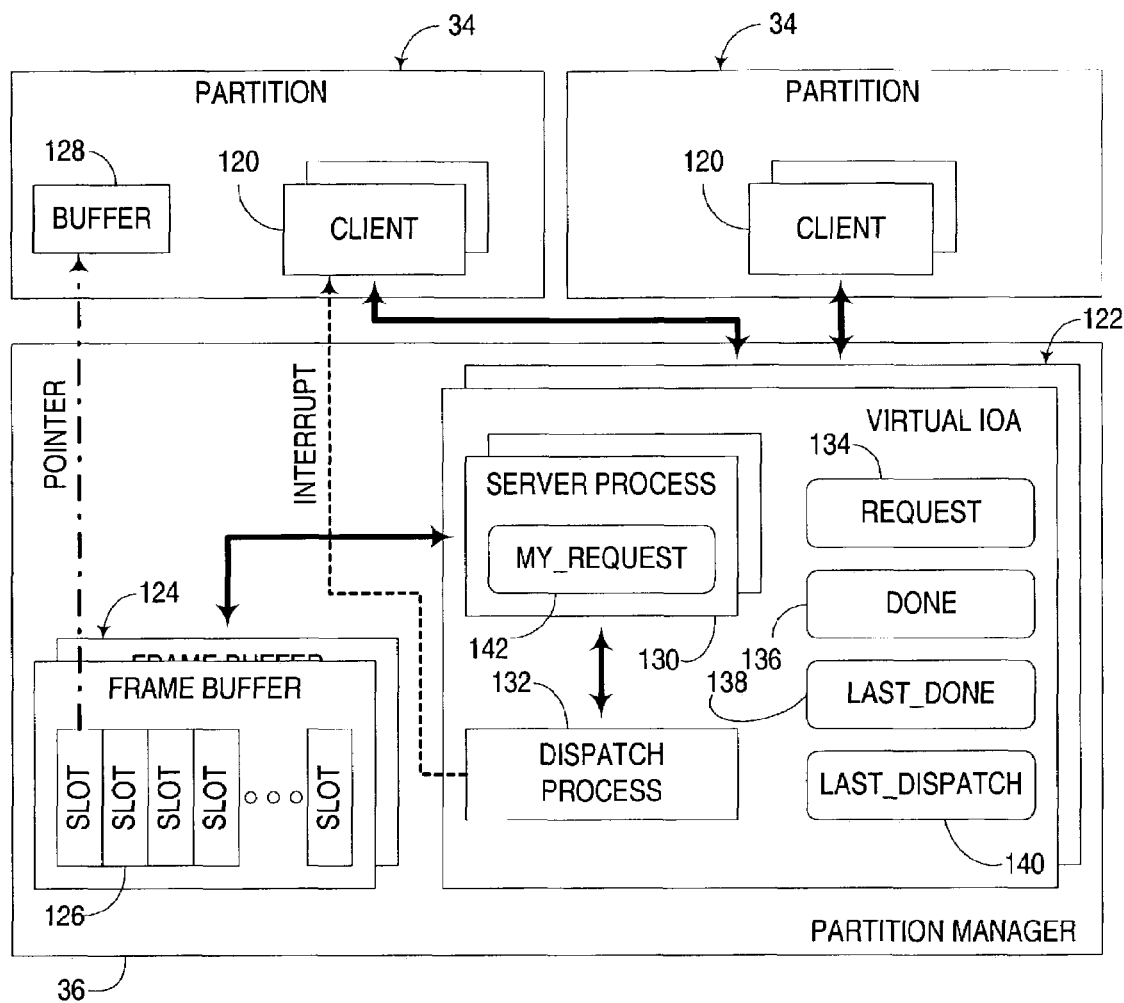
FIG. 4 is a block diagram of the principal components in the computer of FIG. 3 that are involved in managing the concurrent access to a shared resource in the computer.
Figure 5:
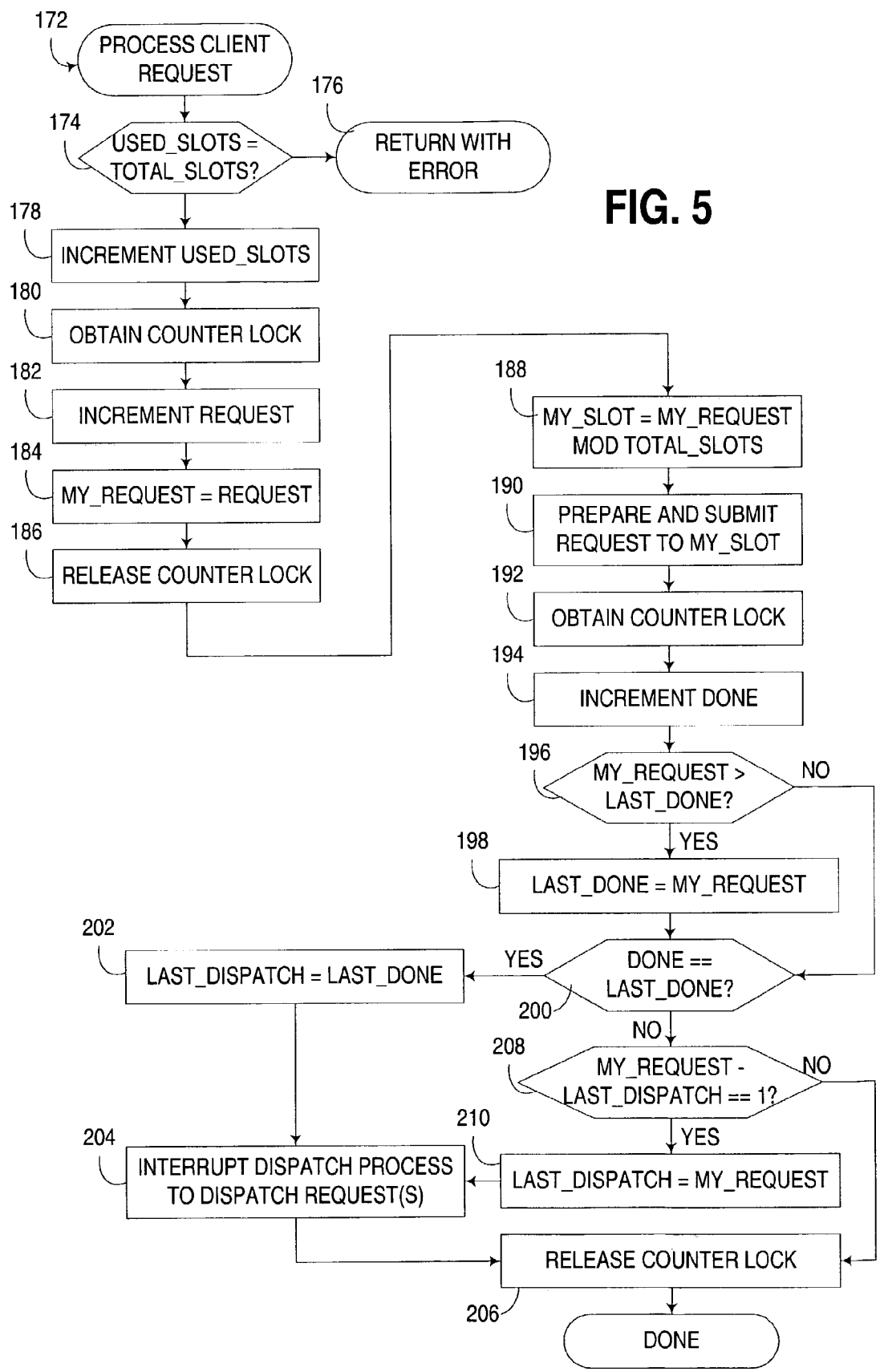
FIG. 5 is a flowchart illustrating the program flow of a process client request routine executed by a server process referenced in FIG. 4.

As noted above, the aforementioned technique for managing concurrent accesses to a shared resource may be used in a wide variety of applications. One specific application, which is described in greater detail below in connection with FIGS. 3–5, is that of managing accesses to a physical or virtual ethernet adapter in a logically-partitioned computer such as computer 10 of FIG. 3. In particular, it is well known that input/output adapters such as ethernet adapters, token ring adapters, etc., have only a finite number of resources, which in this instance are slots in a frame buffer. Multiple clients are typically permitted to consume the slots. Furthermore, consuming a slot may tie up the slot for a significant amount of time, during which other clients would not be able to use the slot. Allowing multiple clients to concurrently consume such slots without impacting other clients would allow more efficient parallel execution in a computer system, and thus increased system performance. Computer 10, as described below, supports such concurrent consumption of slots in a manner consistent with the invention.

Computer 10 generically represents, for example, any of a number of multi-user computers such as a network server, a midrange computer, a mainframe computer, etc., e.g., an IBM eServer computer. However, it should be appreciated that the invention may be implemented in other computers and data processing systems, e.g., in single-user computers such as workstations, desktop computers, portable computers, and the like, or in other programmable electronic devices (e.g., incorporating embedded controllers and the like). In addition, the invention may also be utilized in connection with non-logically partitioned multithreaded computers.

As best shown in FIG. 3, computer 10 generally includes one or more processors 12 coupled to a memory 14 via a bus 16. Each processor 12 may be implemented as a single threaded processor, or as a multithreaded processor, such as with processor 12a, which is shown incorporating a plurality of hardware threads 18. For the most part, each hardware thread 18 in a multithreaded processor 12a is treated like an independent processor by the software resident in the computer. In this regard, for the purposes of this disclosure, a single threaded processor will be considered to incorporate a single hardware thread, i.e., a single independent unit of execution. It will be appreciated, however, that software-based multithreading or multitasking may be used in connection with both single threaded and multithreaded processors to further support the parallel performance of multiple tasks in the computer.

In addition, as is also illustrated in FIG. 3, one or more of processors 12 (e.g., processor 12b) may be implemented as a service processor, which is used to run specialized firmware code to manage system initial program loads (IPL's), and to monitor, diagnose and configure system hardware.

Generally, computer 10 will include one service processor and multiple system processors, which are used to execute the operating systems and applications resident in the computer, although the invention is not limited to this particular implementation. In some implementations, a service processor may be coupled to the various other hardware components in the computer in manner other than through bus 16.

Memory 14 may include one or more levels of memory devices, e.g., a DRAM-based main storage, as well as one or more levels of data, instruction and/or combination caches, with certain caches either serving individual processors or multiple processors as is well known in the art. Furthermore, memory 14 is coupled to a number of types of external devices via a bus 20, e.g., one or more network adapters 22 (for interfacing the computer with network(s) 24), one or more storage controllers 26 (for interfacing the computer with one or more storage devices 28) and one or more workstation controllers 30 (for interfacing with one or more terminals or workstations 32 via a plurality of workstation adapters).

FIG. 3 also illustrates in greater detail the primary software components and resources utilized in implementing a logically partitioned computing environment on computer 10, including a plurality of logical partitions 34 managed by a partition manager or hypervisor 36. Any number of logical partitions may be supported as is well known in the art, and the number of logical partitions resident at any time in a computer may change dynamically as partitions are added or removed from the computer.

In the illustrated IBM eServer-based implementation, partition manager 36 is comprised of two layers of program code. The first, referred to herein as a non-dispatchable portion 38, is implemented within the firmware, or licensed internal code (LIC), of computer 10, which is utilized to provide a low level interface to various hardware components while isolating higher layers, e.g., the operating systems, from the details of the hardware access. The firmware may also communicate with a service processor such as service processor 12b. The non-dispatchable portion 38 provides many of the low level partition management functions for computer 10, e.g., page table management, etc. The non-dispatchable portion 38 also has no concept of tasks, and is accessible principally via function calls from higher layers of software.

The second layer of program code in partition manager 36 is referred to herein as a dispatchable portion 40. In contrast to non-dispatchable portion 38, which has no concept of tasks, is run with relocation off, and is accessible via function calls from higher layers of software, the dispatchable portion 40 has the concept of tasks (like any operating system), and is run with relocation on. The dispatchable portion typically executes in much the same manner as a partition, except that it is hidden from the user. The dispatchable portion generally manages higher level partition management operations such as creating and deleting partitions, concurrent I/O maintenance, allocating processors, memory and other hardware resources to various partitions 34, etc.

Each logical partition 34 is typically statically and/or dynamically allocated a portion of the available resources in computer 10. For example, each logical partition may be allocated one or more processors 12 and/or one or more hardware threads 18, as well as a portion of the available memory space. Logical partitions can share specific hardware resources such as processors, such that a given processor is utilized by more than one logical partition. In the alternative hardware resources can be allocated to only one logical partition at a time.

Additional resources, e.g., mass storage, backup storage, user input, network connections, and the I/O adapters therefor, are typically allocated to one or more logical partitions in a manner well known in the art. Resources may be allocated in a number of manners, e.g., on a bus-by-bus basis, or on a resource-by-resource basis, with multiple logical partitions sharing resources on the same bus. Some resources may even be allocated to multiple logical partitions at a time.

Each logical partition 34 utilizes an operating system 42 that controls the primary operations of the logical partition in the same manner as the operating system of a non-partitioned computer. For example, each operating system 42 may be implemented using the OS/400 operating system available from International Business Machines Corporation.

Each logical partition 34 executes in a separate, or independent, memory space, and thus each logical partition acts much the same as an independent, non-partitioned computer from the perspective of each user application (user app) 44 that executes in each such logical partition. As such, user applications typically do not require any special configuration for use in a partitioned environment.

Given the nature of logical partitions 34 as separate virtual computers, it may be desirable to support inter-partition communication to permit the logical partitions to communicate with one another as if the logical partitions were on separate physical machines. As such, in some implementations it may be desirable to support a virtual local area network (LAN) 46 in non-dispatchable portion 38 to permit logical partitions 34 to communicate with one another via a networking protocol such as the Ethernet protocol. Other manners of supporting communication between partitions may also be supported consistent with the invention.

It will be appreciated that other logically-partitioned environments may be utilized consistent with the invention. For example, rather than utilizing a dispatchable portion 40 that is separate from any partition 34, the functionality of the dispatchable portion may be incorporated into one or more logical partitions in the alternative.

In general, the routines executed to implement the embodiments of the invention, whether implemented as part of an operating system or a specific application, component, program, object, module or sequence of instructions, or even a subset thereof, will be referred to herein as "computer program code," or simply "program code." Program code typically comprises one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROMs, DVDs, etc.), among others, and transmission type media such as digital and analog communication links.

In addition, various program code described hereinafter may be identified based upon the application or software component within which it is implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 3 is not intended to limit the present invention. Indeed, those skilled in the art will recognize that other alternative hardware and/or software environments may be used without departing from the scope of the invention. Specifically, the invention is not limited to use in logically-partitioned environments, but may used in a multitude of other environments that support concurrent and asynchronous access to a shared resource.

Now turning to FIG. 4, an illustration of the principal software components associated with implementing concurrent access to a particularly type of shared resource, here a frame buffer in a virtual input/output adapter. In this implementation, a plurality of clients 120 are disposed in various partitions 34 for the purpose of supporting inter-partition communication between partitions 34 via a virtual local area network (VLAN). In the illustrated embodiments, each client may be implemented, for example, as a device driver resident in a partition.

Disposed within partition manager 36 are a plurality of virtual input/output adapters (IOA's) 122 that are capable of being accessed by clients 120 for communication over the VLAN. Under such a configuration, whenever a client in one partition needs to communicate data to a client in another partition, the data is forwarded from the sending client to a virtual IOA 122 in partition manager 34 that is allocated to the sending client, in much the same manner as data is forwarded to a non-virtual IOA. The data is formatted by the virtual IOA as a conventional network packet (e.g., an ethernet-compatible packet), and communicated to another virtual IOA 122 that is allocated to a recipient client 120 in a different partition 34. This communication of data occurs in software, rather than over a physical cable as would be used in a physical LAN, but otherwise the communication protocol used is the same. The virtual IOA 122 allocated to the recipient client then passes the received data to the recipient client in roughly the same manner as a non-virtual IOA. As such, from the perspective of each client 120, the manner in which data is sent by one client and received by another client is the same as if the data were communicated over a physical LAN.

By implementing a virtual LAN in this manner, the logical construct of partitions as logically-independent computers is maintained, as an application executing in one partition communicates data to another application in another partition as if the other partition was resident on a different physical computer. In many instances, this enables an application configured to executed on a non-logically-partitioned computer to operate in precisely the same manner on a logically-partitioned computer.

Each virtual IOA 122 is associated with one or more frame buffers 124, which are used to send and receive ethernet-compatible frames of data in the same manner as a non-virtual IOA. Each frame buffer 124, in turn, includes a plurality of slots 126, which represent distinct data areas in the buffer. Each slot 126 also includes a pointer to a local buffer in a partition (e.g., buffer 128) for use by an associated client 120.

In the illustrated embodiments, the slots 126 in a frame buffer 124 represent shared resources that are capable of being used in a sequential order by various clients 120. Multiple clients 120 can consume the slots, and as slots are consumed by clients during the processing of requests, it becomes necessary to notify the clients as these resources are consumed. In the illustrated embodiments, for example, clients are notified by issuing interrupts to the clients from the virtual IOA's. As will become more apparent below, consistent with the invention these efforts may be handled in batches, rather than on a request-by-request basis, to improve the efficiency of the dispatch process.

In the embodiment illustrated in FIG. 4, each virtual IOA 122 operates as a resource manager analogous to resource manager 52 of FIG. 1. As such, each virtual IOA 122 includes a plurality of server processes 130, a dispatch process 132, a request counter 134, a done counter 136, a last_done counter 138, and a last_dispatch counter 140. In addition, each server process 130 stores a my_request variable 142 to uniquely identify each request issued by the associated server process. Resource management consistent with the invention typically occurs in connection with the reception of data from a virtual LAN, resulting in clients 120 being notified via interrupts as data therefor is received by the associated virtual IOA.

Now turning to FIG. 5, a process client request routine 172 specifically suited for handling client requests in the environment of FIGS. 3 and 4 is illustrated in greater detail. Routine 172 is similar in many requests to routine 72, but is configured specifically for handling client requests to consume slots in a frame buffer for a virtual input/output adapter. In general, each client request atomically obtains an available slot in a frame buffer, with a new unique identifier assigned to such request by atomically incrementing the request counter. The request identifier modulo the number of slots in the frame buffer is used to obtain the specific slot to use. For this implementation, an additional counter, referred to herein as a used_slots counter is used to maintain the total number of consumed slots. This counter is decremented whenever the client releases a resource, typically via functionality implemented in a routine other than routine 172.

Routine 172 begins in block 174 by determining whether the total number of used slots equals the maximum number of available slots (represented by a total_slots constant or variable). If so, the client request fails, and an error is returned as illustrated in block 176. Otherwise, block 174 passes control to block 178 to increment the number of used slots. Next, blocks 180, 182, 184, and 186 atomically increment the request counter and obtain a request identifier in a similar manner to blocks 74–80 of routine 72.

Control next passes to block 188 to set a current slot (my_slot) for the current request by taking the current request identifier modulo the total number of slots in the frame buffer. Next, in block 190, a request is prepared and submitted to the current slot, whereby processing of the request is complete. As such, control passes to block 192 to obtain the counter lock, and then to block 194 to increment the done counter, in a similar manner to blocks 84 and 86 of routine 72. The remaining operations in routine 172, in particular as shown in blocks 196, 198, 200, 202, 204, 206, 208, and 210, are identical to those disclosed above in connection with blocks 88, 90, 92, 94, 96, 98, 100, and 102 of routine 72, with the dispatch of requests in block 204 occurring via an interrupt to the dispatch process to generate additional interrupts to the various clients in the partitions that need to be notified. In addition, as with blocks 100 and 102 of routine 72, blocks 208 and 210 maybe omitted from routine 172 in some embodiments consistent with the invention.

As a practical example of the use of the invention in the aforementioned implementation, consider the scenario of four logical partitions being coupled to one another over a virtual LAN, with virtual IOA's assigned to each logical partition, and with three of the logical partitions having data that needs to be sent to the fourth partition. Consider that the first partition has 64 KB of data to send, the second partition has only 2 KB of data to send, and the third partition has 64 KB of data send. Under this scenario, assume that the first, second and third partitions issue requests to their respective virtual IOA's, and that these virtual IOA's then format a frame of data to be sent to the virtual IOA for the fourth partition. In addition, the virtual IOA's issue requests to the virtual IOA for the fourth partition in numerical order, i.e., so the requests from the first, second and third partitions are received by the virtual IOA for the fourth partition in order. As such, using routine 172, the requests will be assigned sequential unique identifiers, and will consume the slots in the frame buffer of the virtual IOA for the fourth partition in order.

Once identifiers have been assigned to the requests, however, each server process in the virtual IOA will proceed with handling its request in parallel, e.g., to DMA the respective frame to the client buffer pointed to by the slot consumed by that process. In the illustrative example, however, since the frame of data from the second partition is much smaller than that of the first partition (2 KB vs. 64 KB), it is probable that the request for the second partition will be completed before the request for the first partition. In that event, routine 172 will increment the done counter and set the last_done counter to the unique identifier for the request from the second partition. However, the routine will also detect, at block 200, that not all earlier requests have completed, and as a result, notification of the client in the fourth partition will be deferred until completion of the request from the first partition, at which point a batch dispatch will occur to notify the fourth partition of the reception of both frames of data. In addition, assuming that the request from the third partition is completed some time later, another dispatch will occur to notify the fourth partition of the reception of the third frame of data.

Various modifications to the herein-described embodiments will be apparent to one of ordinary skill in the art having the benefit of the instant disclosure. Therefore, the invention lies in the claims hereinafter appended.

What is claimed is:

1. A method of accessing a shared resource in a computer, the method comprising, in a first process among a plurality of processes capable of asynchronously issuing requests that use the shared resource:
    atomically assigning a unique identifier to a current request that uses the shared resource, wherein the unique identifier is assigned to the current request based upon the order in which the current request is received relative to other requests issued by the plurality of processes;
    completing processing of the current request using the unique identifier;
    atomically incrementing a count of completed requests after processing of the current request is complete;
    atomically determining if processing of every other request issued prior to a most recently completed request has been completed after processing of the current request is complete; and
    in response to determining that processing of every other request issued prior to the most recently completed request has been completed, dispatching each non-dispatched request for which processing has completed.

2. The method of claim 1, wherein completing processing of the current request is performed non-atomically.

3. The method of claim 1, further comprising, in the first process, atomically determining if the current request is the most recently completed request after processing of the current request is complete.

4. The method of claim 1, further comprising, in the first process, after processing of the current request is complete, atomically determining if the current request is the first request issued after a last dispatch operation, and dispatching the current request in response to determining that the current request is the first request issued after the last dispatch operation.

5. The method of claim 1, wherein dispatching each non-dispatched request for which processing has completed includes dispatching a plurality of requests in a batch.

6. The method of claim 1, wherein atomically assigning the unique identifier to the current request includes incrementing a request counter, wherein atomically incrementing the count of completed requests includes incrementing a done counter, wherein the method further comprises atomically updating a last done counter to the unique identifier of the current request after completing processing of the current request is complete in response to determining that the current request is the most recently completed request, wherein atomically determining if processing of every other request issued prior to the most recently completed request has been completed includes comparing the last done counter to the done counter, and wherein dispatching each non-dispatched request for which processing has completed includes updating a last dispatch counter to equal the last done counter.

7. The method of claim 1, further comprising:
    in response to determining that processing of every other request issued prior to the most recently completed request has not been completed, deferring dispatching of each non-dispatched request for which processing has completed; and
    in a second process among the plurality of processes:
        completing processing of an earlier request to the current request, the earlier request having a unique identifier assigned thereto that precedes that of the current request;
        atomically determining that processing of every other request issued prior to the most recently completed request has been completed after processing of the earlier request is complete; and
        in response to determining that processing of every other request issued prior to the most recently completed request has been completed, dispatching each non-dispatched request for which processing has completed.

8. The method of claim 1, wherein completing processing of the current request includes preparing the request.

9. The method of claim 1, wherein the shared resource comprises at least one slot in a frame buffer of an input/output adapter, wherein completing processing of the current request comprises communicating data using the slot, and wherein dispatching each non-dispatched request comprises notifying a client of reception of the communicated data.

10. The method of claim 1, wherein the shared resource is selected from the group consisting of a processor, a hardware device, an input/output device, a storage device, an adapter, a controller, a database, a file system, a service, and a component of the same.

11. The method of claim 6, wherein each of the request, done, last done and last dispatch counters is updated using a monotonically-increasing sequence of numbers.

12. The method of claim 9, wherein the computer comprises a logically-partitioned computer, and wherein the input/output adapter is a virtual input/output adapter coupled to a virtual local area network used for inter-partition communication in the logically-partitioned computer.

13. An apparatus, comprising:
a shared resource;
at least one processor configured to execute a plurality of processes capable of asynchronously issuing requests that use the shared resource; and
program code configured to be executed on the at least one processor in a first process to atomically assign a unique identifier to a current request that uses the shared resource; complete processing of the current request using the unique identifier; atomically increment a count of completed requests after processing of the current request is complete; atomically determine if processing of every other request issued prior to a most recently completed request has been completed after processing of the current request is complete; and in response to determining that processing of every other request issued prior to the most recently completed request has been completed, dispatch each non-dispatched request for which processing has completed, wherein the unique identifier is assigned to the current request based upon the order in which the current request is received relative to other requests issued by the plurality of processes.

14. The apparatus of claim 13, wherein the program code is configured to complete processing of the current request non-atomically.

15. The apparatus of claim 13, wherein the program code is further configured to atomically determine if the current request is the most recently completed request after processing of the current request is complete.

16. The apparatus of claim 13, wherein the program code is further configured to, after processing of the current request is complete, atomically determine if the current request is the first request issued after a last dispatch operation, and dispatch the current request in response to determining that the current request is the first request issued after the last dispatch operation.

17. The apparatus of claim 13, wherein the program code is configured to dispatch each non-dispatched request for which processing has completed by dispatching a plurality of requests in a batch.

18. The apparatus of claim 13, further comprising a request counter, a done counter, a last done counter and a last dispatch counter, wherein the program code is configured to atomically assign the unique identifier to the current request by incrementing the request counter, wherein the program code is configured to atomically increment the count of completed requests by incrementing the done counter, wherein the program code is further configured to atomically update the last done counter to the unique identifier of the current request after completing processing of the current request is complete in response to determining that the current request is the most recently completed request, wherein the program code is configured to atomically determine if processing of every other request issued prior to the most recently completed request has been completed by comparing the last done counter to the done counter, and wherein the program code is configured to dispatch each non-dispatched request for which processing has completed further by updating the last dispatch counter to equal the last done counter.

19. The apparatus of claim 13, wherein the program code is first program code, wherein the first program code is further configured to defer dispatching of each non-dispatched request for which processing has completed in response to determining that processing of every other request issued prior to the most recently completed request has not been completed, and wherein the apparatus further comprises second program code configured to execute on the at least one processor in a second process to complete processing of an earlier request to the current request, the earlier request having a unique identifier assigned thereto that precedes that of the current request; atomically determine that processing of every other request issued prior to the most recently completed request has been completed after processing of the earlier request is complete; and in response to determining that processing of every other request issued prior to the most recently completed request has been completed, dispatch each non-dispatched request for which processing has completed.

20. The apparatus of claim 13, wherein the program code is configured to complete processing of the current request by preparing the request.

21. The apparatus of claim 13, wherein the shared resource comprises at least one slot in a frame buffer of an input/output adapter, wherein the program code is configured to complete processing of the current request by communicating data using the slot, and wherein the program code is configured to dispatch each non-dispatched request by notifying a client of reception of the communicated data.

22. The apparatus of claim 13, wherein the shared resource is selected from the group consisting of a processor, a hardware device, an input/output device, a storage device, an adapter, a controller, a database, a file system, a service, and a component of the same.

23. The apparatus of claim 18, wherein each of the request, done, last done and last dispatch counters is updated using a monotonically-increasing sequence of numbers.

24. The apparatus of claim 21, wherein the apparatus comprises a logically-partitioned computer, and wherein the input/output adapter is a virtual input/output adapter coupled to a virtual local area network used for inter-partition communication in the logically-partitioned computer.

25. A program product, comprising:
program code configured to be executed in a first process among a plurality of processes in a computer that are capable of asynchronously issuing requests that use a shared resource to atomically assign a unique identifier to a current request that uses the shared resource; complete processing of the current request using the unique identifier; atomically increment a count of completed requests after processing of the current request is complete; atomically determine if processing of every other request issued prior to a most recently completed request has been completed after processing of the current request is complete; and in response to determining that processing of every other request issued prior to the most recently completed request has been completed, dispatch each non-dispatched request for which processing has completed, wherein the unique identifier is assigned to the current request based upon the order in which the current request is received relative to other requests issued by the plurality of processes; and a tangible computer readable signal bearing medium bearing the program code.

* * * * *